Figure 1:
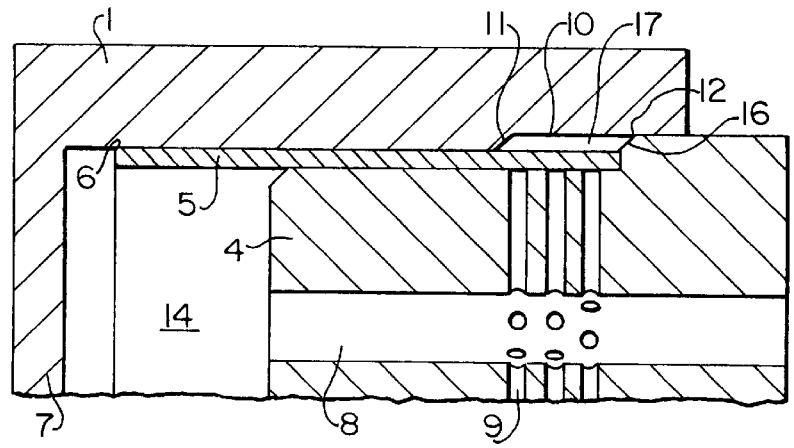

United States Patent

Beste et al.

[11] Patent Number: 5,956,988
[45] Date of Patent: Sep. 28, 1999

[54] PROCESS FOR HEADING PIPE ENDS AND DEVICE FOR IMPLEMENTING IT

[75] Inventors: Andreas Beste, Gaimersheim; Hansjorg Lipowsky, Hepberg; Jurgen Oswald, Magdeburg; Manfred Janssen, Krefeld, all of Germany

[73] Assignee: Audi AG and Fahrzeugwerk Werdau, Germany

[21] Appl. No.: 08/817,416

[22] PCT Filed: Oct. 13, 1995

[86] PCT No.: PCT/DE95/01423

§ 371 Date: Jun. 17, 1997

§ 102(e) Date: Jun. 17, 1997

[87] PCT Pub. No.: WO96/12578

PCT Pub. Date: May 2, 1996

[30] Foreign Application Priority Data

Oct. 19, 1994 [DE] Germany ............... 44 37 395

[51] Int. Cl.[6] ................................................. B21D 31/00
[52] U.S. Cl. ................ 72/57; 72/367.1; 72/370.03; 72/370.15; 72/377
[58] Field of Search .................... 72/318, 367.1, 72/370.03, 377, 57, 58, 61, 62, 370.15

[56] References Cited

U.S. PATENT DOCUMENTS

| 1,882,352 | 10/1932 | Woodhead et al. ............... 29/897.2 |
| 2,053,975 | 9/1936 | Spatta ............................. 72/318 |
| 2,268,246 | 12/1941 | Dooley ........................... 72/367 |
| 3,383,888 | 5/1968 | Aschberger ..................... 72/367 |
| 3,487,668 | 1/1970 | Fuch, Jr. ......................... 72/58 |
| 4,213,322 | 7/1980 | Barnes, Jr. ...................... 72/357 |
| 4,557,128 | 12/1985 | Costabile ........................ 72/62 |
| 4,845,972 | 7/1989 | Takeuchi et al. ............... 72/370 |
| 5,184,495 | 2/1993 | Chunn et al. ................... 72/370 |
| 5,203,194 | 4/1993 | Marquardt . | |

FOREIGN PATENT DOCUMENTS

| 8809031 | 11/1988 | Germany . | |
| 406127 | 2/1946 | Italy ............................... 72/318 |
| 76638 | 5/1984 | Japan ............................. 72/318 |
| 279327 | 12/1986 | Japan ............................. 72/318 |

*Primary Examiner*—David Jones
*Attorney, Agent, or Firm*—Lalos & Keegan

[57] ABSTRACT

The present invention is a novel device and method of shaping an end of a pipe. One end of a pipe is inserted into a shaped die in such a way that the outer surface of the pipe rests against the interior portion of the die. A piston is then inserted into the pipe in such a way that the outer surface of the piston rests against the interior surface of the pipe. The piston is then forcibly driven into the die against the pipe as to forcibly shape the pipe to a predetermined configuration. The present invention also discloses numerous embodiments to shape a pipe.

21 Claims, 2 Drawing Sheets

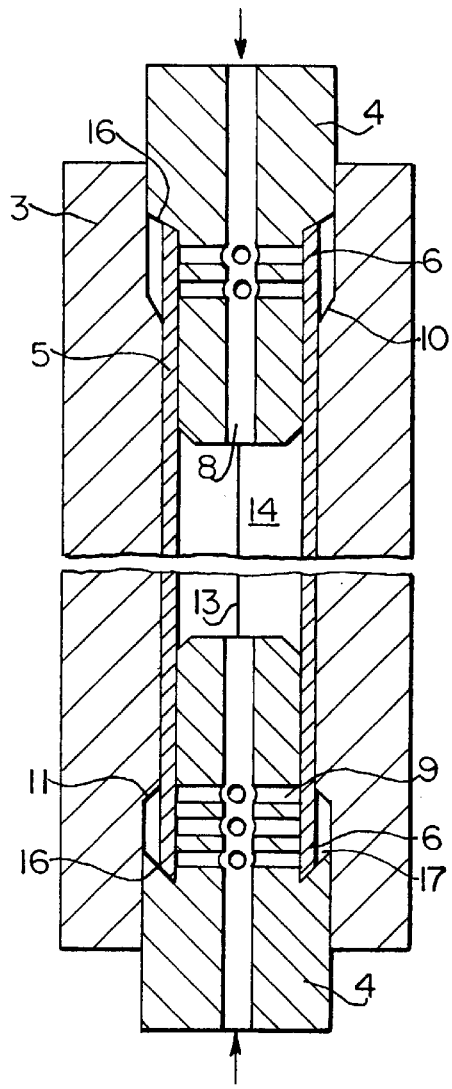
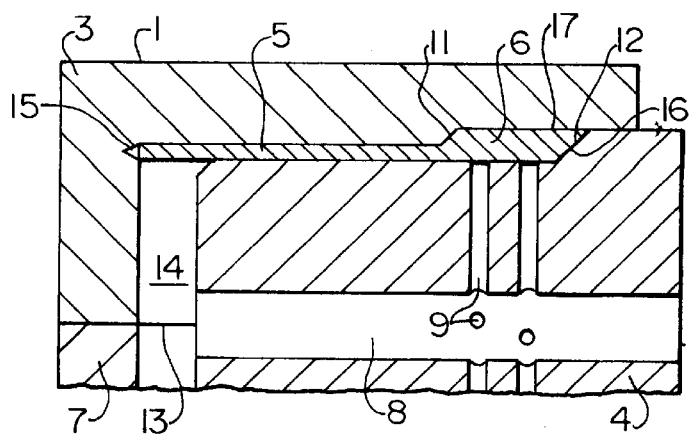
FIG. 3
FIG. 4

PROCESS FOR HEADING PIPE ENDS AND DEVICE FOR IMPLEMENTING IT

The invention relates to a process for heading pipe ends. A device is also proposed for application of the process.

Tubular machine components such as exhaust gas systems for internal combustion engines have up to the present been made predominantly with pipes of uniform cross-sectional dimensions.

Parts of such components with cross-sectional dimensions modified as required by the function involved are customarily inserted into the component by means of flanges, welds, or other methods, for example, for the purpose of fastening particular machine elements or components. Such components and machine elements may be, among other things, sound absorbers, catalytic converters, or connecting flanges.

The consequence of a procedure such as this is represented by high manufacturing cost and, in addition to lengthy manufacturing periods, by more or less function-impairing disruptions of the flow pattern resulting from additional unevennesses of the interior wall of the tubular component group.

An attempt is usually made to eliminate these consequences by dimensioning the cross-sections of the pipes to be used on the basis of the highest mechanical and/or thermal stresses to be anticipated, this necessarily entailing additional consumption of material and needlessly high product weight.

This procedure also results in the disadvantage that necessary reshaping processes, such as ones employed in manufacture of pipe bends, must be carried out under difficult conditions.

U.S. Pat. No. 5,203,194 discloses a process for manufacture of a trailer coupling for motor vehicles. An end section of a shaped piece square in shape is formed by introduction of axial pressure. No particular quality requirements are set as regards dimensional accuracy or a uniform interior wall promoting flow after the modification of the shape.

The object of the invention is to develop a process for heading pipe ends and a device for application of the process by means of which a tubular structural element with more or less optimum cross-sectional dimensions may be provided with end sections of increased cross-sectional dimensions such that the interior diameter remains unchanged, with virtually no transitional area even in the area of the end of the pipe, while the necessary cross-sectional dimensions nevertheless remain available for the addition of components such as connecting flanges, sound absorbers, catalytic converters, and the like. Solution of the problem accordingly requires a technique by means of which the reshaping desired can be accomplished efficiently and with thermal overstress prevented to the greatest extent possible.

It is claimed for the invention that the problem is solved by a process in which the pipe end is headed axially and is reinforced circumferentially in the radial direction.

It may be pointed out in this connection that DE 88 09 031 U1 proposes a device for reshaping metal pipe pieces, a device in which the shaping die required is in the form of a hydraulic molding system with at least four parts and also having pipe piece mountings. In order to prevent undesirable deformation of the pipe pieces to be reshaped when an axial load is applied, a bearing fluid is introduced into the interior of the pipe by at least one of the axial pistons used.

This technical solution provides no guidance regarding the heading of pipe ends on bent or unbent pipe pieces, since the problem as stated is that primarily widening of pipe pieces is to be accomplished for the purpose of at least partial enlargement of the interior diameter, this necessarily entailing partial reduction of the wall thickness.

The invention also describes an especially well-suited device in which a piston is introduced from the front into the pipe to be headed, this piston forces the pipe end by a suitable shoulder surface in the axial direction from the front of the pipe, while simultaneously pressure is applied through suitable openings to the interior wall of the pipe, for example, by means of a fluid. Supported by the axial pressure, this pressure reinforces the pipe wall in the end area. The geometric formation of the wall resulting from deformation is defined by the corresponding formation of the die into which the pipe is inserted.

It is preferable for the remaining area of the pipe to be kept under pressure by the fluid, in order to guarantee application of the pipe to the die in this area as well.

Hence what takes place is cold forming by means of a tool set consisting essentially of a shaped hollow or annular die and one or more axial pistons. A flow-pressing process is carried out by means of this tool set, as well as multidimensional load application, in particular to the pipe end to be worked. For this purpose the pipe end to be worked is first provided with an end sealing surface, if required, and is then inserted into a shaped die in the form of a one-piece or multipart hollow or annular die.

A stepped axial piston is then inserted into the pipe to be headed so that the sealing shoulder of the axial piston is applied to the sealing surface of the pipe end to be shaped. Fixing of the position of the axial piston in the longitudinal direction by an axial bore in the axial piston is subsequently accompanied by delivery of a pressurized fluid through the axial piston in such a way that both deformation causing forced seating of a pipe area ahead of the axial piston against a stationary die bottom, against another axial piston, or closing of the free pipe end in the die and application of a radial load to the pipe end to be reformed take place.

A specific transverse axial load is now applied to the axial piston, under the action of which load plastic deformation of the pipe end continues until the cavity between the retaining edge of the die and the sealing shoulder of the axial piston is filled with the headed material of the pipe end to be reformed.

Load is also applied to the interior of the pipe in the forced seating area by the pressurized fluid in the radial direction, without it being possible for deformation to occur there because of direct application of the pipe wall to the die. In contrast, application of a tangential load to the pipe wall occurs in the heading area during the expansion process under the action of the radial load application by the pressurized fluid, and at the same time axial load application by the transverse force of the axial piston takes place. The resulting multidimensional load application exceeds the elastic deformation resistance by a specific value and brings about the plastic deformation desired. In theory all incompressible fluids are suitable as pressurized fluids.

In one particular embodiment of the process provision is made for use of water, preferably water with synthetic additives, as the pressurized fluid.

In another embodiment provision is made for increasing the axial transverse force FA as required together with the internal pressure $p_i$ as a function of the open pipe cross-sectional area AR in accordance with the statement $$F_A \geq 1{,}1 * A_R * p_i.$$

This ensures among other things that under no circumstances will bowing of the pipe wall in the forced seating area occur as a result of increased transverse axial forces on one side.

It is also possible to provide the die and/or the axial piston in the area of the increase in pipe thickness to be effected with a coating reducing friction between pipe and tool. In this way the forces introduced are activated to the maximum extent for the plastic working process without occasioning significant friction losses. This purpose is also served by the proposal that the active joint in the extended area of the die be provided with a lubricating filler reducing friction between pipe and tool.

It is claimed for the invention that the problem is solved by employing a device consisting of a shaped die designed as a closed hollow die, a divided hollow die, or a divided annular die, and of at least one stepped axial piston. The axial piston has a central axial bore and, in the heading area beyond the sealing shoulder, radial bores arranged in a star pattern for delivery of pressure means to the pipe interior wall to be reformed. In addition, the transition between the clear diameter of the die and the extended part of the die profile is in the form of a retaining edge in the heading area. The transition between the area of the axial piston having radial bores and the extended area of the region of the axial piston closing off the die is designed as a sealing shoulder.

In a preferred embodiment the die is designed as a closed one-piece or multipart hollow die provided with a hollow die bottom.

The die is in the form of a divided annular die in particular for the heading of ends of bent pipe pieces and for the heading of both ends of straight pipe pieces.

In the case of a die designed as a hollow die preference is to be given to an embodiment in which the bottom of the hollow die is provided with a pointed groove including the pipe wall and acting as a sealing element. The pointed groove acts as an abutting surface which is in contact with at least one edge of the annular cross-sectional area of the pipe wall and, when an axial load is applied to the pipe, forms a sealing pair preventing escape of pressurized fluid from the interior of the pipe.

In another embodiment a forced seating area is formed between the face of the axial piston and the end of the die. This forced seating makes it possible, even in the event of failure of the pipe piece to be seated on the bottom of the die bottom, to ensure sufficient positioning of the pipe piece so that this piece cannot be displaced in the die by application of an axial load to the pipe piece. This is a prerequisite for heading pipe pieces of different lengths by means of a single tool set, if such is desired. The forced seating area may be formed either between the face of the axial piston and the bottom of the hollow die or, preferably in a divided annular die, between the face of the axial piston and a pipe connection, or again between the faces of two axial pistons.

One advantageous embodiment of the device claimed for the invention provides that the sealing surface of the faces of the pipe ends to be headed be designed by metal cutting or cold working processes as an annular surface oriented transversely to the longitudinal axis of the axial piston or as a rotationally symmetrical surface. Together with the sealing shoulder this sealing surface forms another sealing pair as a flat annular surface oriented transversely to the longitudinal axis of the axial piston and/or as a rotationally symmetrical surface referred to the longitudinal axis of the axial piston. This seal prevents leakage of pressurized fluid from the interior of the pipe in the area of the pipe end to be headed.

Another embodiment of the device claimed for the invention is characterized in that the die is shaped as a section adjoining the pipe piece to be reformed and another section extended at least to the dimension of the external diameter of the pipe end to be headed.

A preferred form of the device requires that the divided annular die be provided with two die sections and with two axial pistons for simultaneous heading on both sides of straight or bent pipe pieces. It is necessary in this embodiment in one operating cycle both to establish the interior pressure by means of pressurized fluid and to apply axial transverse loads to each of the axial pistons. Simplified means are of course employed in this cycle to reshape two heading areas simultaneously and prepare them for additional machining process, it being possible to make headed pipe ends of different dimensions.

Lastly, it may also be advantageous to design the closed hollow die with state-of-the-art ejection devices ensuring ejection of the headed pipe piece.

The advantages of the invention reside primarily in the circumstance that reduced-weight tubular subassemblies with optimum hydraulic engineering characteristics may be produced with minimum consumption of materials and without entailing the previously necessary time-consuming and costly joining procedures. Similarly, the employment of thermal load application techniques may be greatly reduced, especially in areas of increased mechanical stress.

The invention is described in what follows with reference to particular embodiments.

Figure 2:
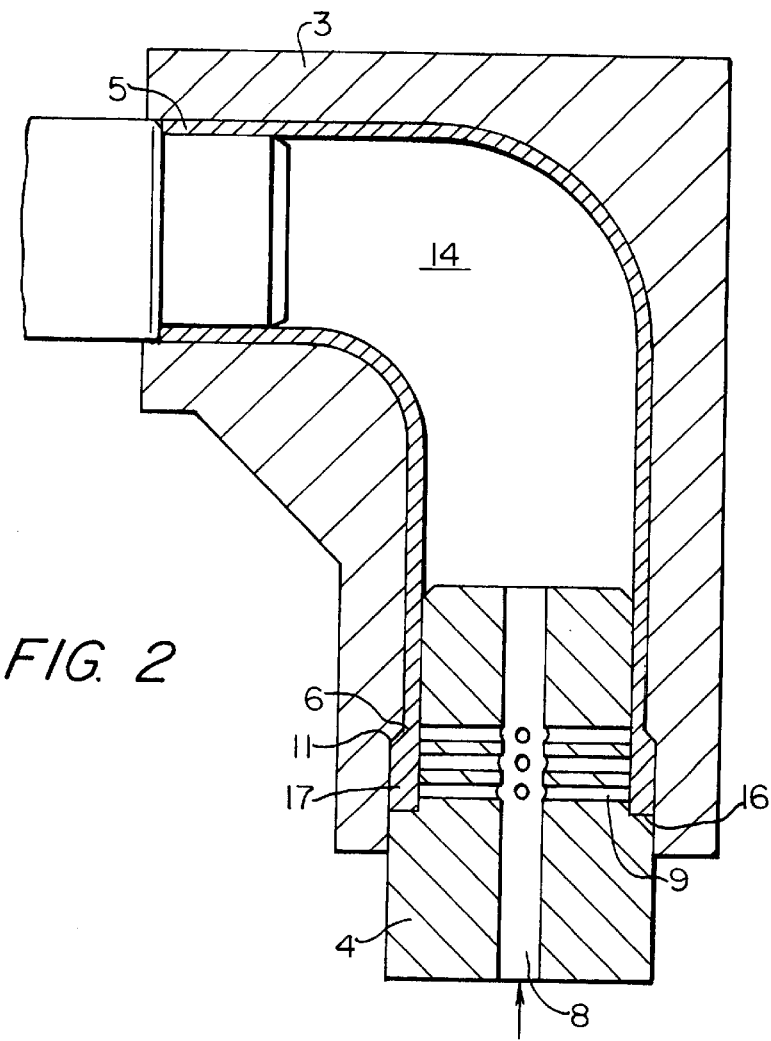

In the attached drawing,

FIG. 1 shows a cross-sectional diagram of a device claimed for the invention at the time of commencement of operation, a device consisting of a hollow die and a stepped axial piston with bores for the pressure means (in fixing of the pipe piece in the die by the internal pressure built up behind the axial piston, this pressure causing forced seating of the pipe piece in the hollow die);

FIG. 2 a cross-sectional diagram of a device claimed for the invention at the end of the heading process, a device consisting of a divided annular die and a stepped axial piston with axial bores for the pressure medium (in axial positioning of the pipe piece by forced seating effected by pressurized fluid between a pipe connection and the face of the axial piston);

FIG. 3 a cross-sectional diagram of a device claimed for the invention at the beginning of the heading process, a device consisting of an annular die divided parallel to the longitudinal axis and two stepped axial pistons; and FIG. 4 a cross-sectional diagram of a device claimed for the invention at the end of the heading process, a device consisting of a divided hollow die and a stepped axial piston with bores for the pressure medium in axial positioning of the pipe piece by impact against the bottom of the hollow die.

Embodiment 1:

The requirement is set for production of the end piece of a passenger automobile exhaust system to be fastened to the rear muffler by a weld connection. As is to be seen from FIG. 1 or FIG. 4, a steel pipe with a wall thickness of 1.5 mm and external wall diameter of 60 mm is for this purpose introduced as a pipe piece 600 mm long 5 into a one-piece closed hollow die 1. The hollow die 1 has a bottom 7 which is provided in the area adjoining the die wall with a pointed groove 15. The pointed groove 15, 3 mm wide, receives the pipe piece 5 so that a sealing pair is formed between the inner edge of the pipe wall and the inner side of the pointed groove 15 by application of an axial load to the pipe piece, the side of the pointed groove 15 and the inner edge of the tightly fitting pipe wall adjoining each other and local plastic deformation taking place.

The hollow die 1 has an internal diameter of about 60 mm over a length of 540 mm. Over a length of 60 mm the internal diameter of the hollow die 1 is extended to 63 mm. The transition from the smaller to the larger diameter is in the form of a shoulder with a retaining edge inclined at an angle of 30° to the perpendicular to the longitudinal axis.

The tool set also includes an axial piston 4 which is provided with a through axial bore for the pressure medium 8.

The shaped axial piston 4 consists of a portion 100 mm long to be introduced into the pipe piece 5, a piece with an internal diameter of approximately 57 mm.

Adjoining this area of the shaped axial piston 4 is another area 100 mm long with an external diameter of approximately 63 mm. The transition from the small to the large external diameter of the axial piston 4 is in the form of a sealing shoulder 16 whose cut edge is inclined at an angle of 15° to the vertical of the longitudinal axis of the axial piston 4.

Between the sealing shoulder 16 and the retaining edge 11 there is formed between the axial piston 4 and the hollow die 1 an active joint 17.

In the area with the smaller diameter the axial piston 4 has, spaced at distances of up to 50 mm from the sealing shoulder 16, a total of three rows of radial bores 9 arranged in a starshaped pattern, each bore having a diameter of 6 mm and the bores being positioned between the axial bore 8 and the circumference of the axial piston 4. Six individual bores per row of bores are offset at an angle of 60°.

After the sealing shoulder 16 of the axial piston 4 is applied to the sealing surface 12 of the pipe piece 5, there is initially applied to the axial piston 4 an axial transverse force of 5 kN. Then pressurized fluid in the form of water is pumped through the axial bore 8 in the axial piston 4 and is subsequently subjected to a pressure of 0.5 MPa. In this situation there is formed between the face of the axial piston 4 and the bottom of the hollow die 7 a forced seating area in which the pipe piece 5 adjacent to the die wall is supported against buckling by the pressurized fluid. The pressurized fluid is distributed evenly by way of the radial bores for the pressure medium 9 over the pipe end 6. As a result of increase in the axial transverse force FA on the axial piston to a value exceeding 100 kN and simultaneous increase in the internal pressure $p_i$ of the pressurized fluid to at least 15 MPa, plastic deformation of the pipe end 6 takes place to the point of complete filling of the active joint 17 with the headed pipe material. With the wall of the pipe end 6 reinforced, the internal diameter of this pipe end remains unchanged but the wall thickness of the end is increased to about 3 mm, the length of the pipe end 6 amounting to about 30 mm.

After the reforming process has been completed, the axial piston 4 is removed from the hollow die 1 and the pressure of the pressurized fluid is simultaneously relieved.

Three ejectors distributed over the circumference of the pointed groove 15 are then removed from the bottom of the hollow die 7, this resulting in release of the headed pipe piece 5 from the hollow die 1.

The initially straight headed pipe piece 5 may if desired subsequently be subjected to bending processes.

Embodiment 2:

The straight piece of a passenger automobile exhaust system between catalytic converter and sound absorber is to be provided simultaneously at both pipe ends 6 with reinforced walls in order to ensure sufficiently load-resistant weld joints. As is to be seen from FIG. 3, a divided annular die 3 is used for this purpose. The annular die has a total length of 1,000 m. On both ends it has areas in which the general internal diameter of the annular die 3 is extended from 50 to 55 mm. The length of each of the extended areas is 100 mm. The pipe piece 5, with an external diameter of approximately 50 mm and a wall thickness of 2 mm, which piece is introduced into the hollow die, is 900 mm long.

The axial piston 4 to be inserted into both ends of the divided annular die 3 are, as in embodiment 1, provided with axial bores 8 and radial bores 9. The forced seating area 14 is formed after simultaneous application of an initial transverse force to both axial pistons 4 and after filling of the forced seating area 14 between the ends of the axial pistons with a pressured fluid in the form of a water-oil emulsion and causes positioning of the pipe piece 5 in the annular die 3.

After completion of the plastic deformation of the two pipe ends 6 caused by simultaneous increase in the transverse forces applied to the axial pistons 4 and in the pressure of the pressurized fluid until the active joints 17 are completely filled with the material of the pipe wall, the inserted pipe piece 5 has a total length of approximately 840 mm. The headed pipe ends 6 each have a wall thickness of 4.5 mm over a length of 20 mm, while the internal diameter remains unchanged at 46 mm. After disassembly of the divided annular die 3 the pipe piece 5, headed on both sides, may be removed for additional working. It may if necessary be provided with bends over the required circumference.

Embodiment 3:

A bent pipe piece 5 with thickened pipe end 6 is required for reception of a flange connection, as part of a hydraulically optimized exhaust system characterized by difficult geometry.

As may be seen from FIG. 2, a divided annular die is used to provide for reception of a bent pipe end 5.

The pipe end 6 is headed in an unbent end area of the pipe piece 5.

After insertion of the pipe piece 5 and closing of the divided annular die 3, a pipe connection is inserted at the end of the pipe piece 5 not to be headed, in such a way that the forced seating area 14 formed in advance of the pipe connection through application of pressure by a pressurized fluid is situated exclusively in the pipe length area enclosed by the annular die 3.

Insertion of the axial piston 4 and application of load to it in the form of a transverse force, as well as application of internal pressure by means of pressurized fluid, a mineral oil being used as the latter in this case, proceed analogously to the processes described for embodiment 2.

In this way there is imparted to the bent pipe piece with an external diameter of 50 mm and a wall thickness of 2 mm a headed pipe end having a length of 25 mm, the wall thickness in this area amounting to about 4.5 mm with an external diameter of 55 mm.

After the heading process has been completed, the pipe connection is removed and the annular die 3 is opened. The removable bent headed pipe piece 5 is then available for finishing with a flange connection.

List of Reference Numbers 1 closed hollow die
2 divided hollow die
3 divided annular die
4 axial piston
5 pipe piece
6 pipe end
7 bottom of hollow die
8 axial bore for pressure medium
9 radial bore for pressure medium
10 die section
11 retaining edge 12 sealing surface
13 plane of separation of die
14 forced seating area
15 pointed groove
16 sealing shoulder
17 active joint

We claim:

1. An apparatus for enlarging an end-wall of a pipe by a plastic deformation process, comprising:
   a die having a cavity and a larger cavity separated by a retaining edge;
   a piston having a piston wall, a plurality of radial bores, and a sealing shoulder;
   inserting the pipe into the die with the end-wall disposed in the larger cavity;
   inserting the piston into the die trapping the pipe therebetween;
   exerting a frontal pressure on the piston and a radial pressure by injecting a pressurized fluid via the radial bores to plastically deform and enlarge the end-wall into a shape defined by the retaining edge, the larger cavity, the piston wall and the sealing shoulder.

2. The apparatus of claim 1, further comprising:
   increasing the radial pressure until a cold setting of the end-wall is achieved.

3. The apparatus of claim 1, wherein the die is one of a hollow die, a divided hollow die, an annular die, a divided annular die and a bent divided annular die.

4. The apparatus of claim 3, wherein another end of the pipe is secured by an end closure in the hollow die and the divided hollow die, another piston in the annular die and the divided annular die, and a pipe plug in the bent divided annular die.

5. The apparatus of claim 4, wherein a forced seating area resides between a front wall of the piston and the end closure in the hollow die and the annular die, between a front face of the piston and the pipe plug in the bent divided annular die, and between a front face of the piston and a front face of the another piston in the divided hollow die and the divided annular die.

6. The apparatus of claim 4, wherein the end closure comprises a pointed groove serving as a sealing element.

7. The apparatus of claim 1, wherein the cavity has a first diameter and the larger cavity has a second diameter.

8. The apparatus of claim 7, wherein the piston wall has a third diameter that is substantially equivalent to a difference between the first diameter and twice a thickness of the end-wall, and the sealing shoulder has an outer diameter substantially the same as the second diameter.

9. The apparatus of claim 7, wherein the pipe has an outer diameter substantially the same as the first diameter.

10. The apparatus of claim 7, wherein the retaining edge has an incremental diameter ranging between the first diameter and the second diameter.

11. The apparatus of claim 8, wherein the sealing shoulder has an incremental diameter ranging between the third diameter and the second diameter.

12. The apparatus of claim 1, wherein the retaining edge, the larger cavity, the piston wall and the sealing shoulder have been treated by a friction reducing coating.

13. A process of enlarging an end-wall of a pipe, comprising:
    providing a die having a cavity and a larger cavity separated by a retaining edge;
    providing a piston having a piston wall, a plurality of radial bores, and a sealing shoulder;
    inserting the pipe into the die with the end-wall disposed in the larger cavity;
    inserting the piston into the die trapping the pipe therebetween;
    exerting a frontal pressure on said piston and a radial pressure by injecting a pressurized fluid via the radial bores to plastically deform and enlarge the end-wall into a shape defined by the retaining edge, the larger cavity, the piston wall and the sealing shoulder.

14. The process of claim 13, further comprising:
    increasing the radial pressure until a cold setting of the end-wall is achieved.

15. An apparatus for heading a first end-wall and a second end-wall of a pipe by a plastic deformation process, comprising:
    a die having a cavity residing between a first retaining edge connected to a first larger cavity and a second retaining edge connected to a second larger cavity;
    a first piston having a first piston wall, a plurality of first radial bores, and a first sealing shoulder;
    a second piston having a second piston wall, a plurality of second radial bores, and a second sealing shoulder;
    inserting the pipe into the die with the first end-wall disposed in the first larger cavity and the second end-wall disposed in the second larger cavity;
    inserting the first piston into the die from one end and the second piston into the die from another end trapping the pipe therebetween; and
    exerting a first frontal force and a second frontal force correspondingly on said first and second pistons and injecting a first pressurized fluid and a second pressurized fluid correspondingly through the first and second radial bores to plastically deform and enlarge the first and second end-walls correspondingly into a first shape defined by the first retaining edge, the first larger cavity, the first piston wall, the first sealing shoulder and a second shape defined by the second retaining edge, the second larger cavity, the second piston wall, the second sealing shoulder.

16. The apparatus of claim 15, further comprising:
    increasing a pressure of the first pressurized fluid and a pressure of the second pressurized fluid until a cold setting of the end-walls are achieved.

17. The apparatus of claim 15, wherein the cavity has a first diameter and the first larger cavity has a second diameter.

18. The apparatus of claim 17, wherein the first piston wall has a third diameter that is substantially equivalent to a difference between the first diameter and twice a thickness of the first end-wall, and the first sealing shoulder has an outer diameter substantially the same as the second diameter.

19. The apparatus of claim 17, wherein the pipe has an outer diameter substantially the same as the first diameter.

20. The apparatus of claim 17, wherein the first retaining edge has an incremental diameter ranging between the first diameter and the second diameter.

21. The apparatus of claim 18, wherein the first sealing shoulder has an incremental diameter ranging between the third diameter and the second diameter.

* * * * *